United States Patent
Aggarwal et al.

(10) Patent No.: US 8,060,816 B1
(45) Date of Patent: Nov. 15, 2011

(54) METHODS AND APPARATUS FOR INTELLIGENT CRAWLING ON THE WORLD WIDE WEB

(75) Inventors: Charu C. Aggarwal, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2582 days.

(21) Appl. No.: 09/703,174

(22) Filed: Oct. 31, 2000

(51) Int. Cl.
*G06F 17/00* (2006.01)

(52) U.S. Cl. .................. 715/205; 715/234; 715/255

(58) Field of Classification Search .............. 715/501.1, 715/513, 530; 707/6, 3, 4
See application file for complete search history.

(56) References Cited

U.S. PATENT DOCUMENTS

| | | | | |
|---|---|---|---|---|
| 6,073,135 | A * | 6/2000 | Broder et al. ................. 707/100 |
| 6,112,203 | A * | 8/2000 | Bharat et al. ..................... 707/5 |
| 6,178,419 | B1 * | 1/2001 | Legh-Smith et al. ............. 707/6 |
| 6,295,529 | B1 * | 9/2001 | Corston-Oliver et al. ........ 707/3 |
| 6,411,952 | B1 * | 6/2002 | Bharat et al. ..................... 707/5 |
| 6,415,294 | B1 * | 7/2002 | Niemi .......................... 707/102 |
| 6,438,539 | B1 * | 8/2002 | Korolev et al. ................... 707/3 |
| 6,463,430 | B1 * | 10/2002 | Brady et al. ...................... 707/3 |
| 6,519,564 | B1 * | 2/2003 | Hoffberg et al. ........... 704/270.1 |
| 6,529,901 | B1 * | 3/2003 | Chaudhuri et al. ............... 707/3 |
| 6,633,868 | B1 * | 10/2003 | Min et al. .......................... 707/3 |
| 6,665,837 | B1 * | 12/2003 | Dean et al. ................. 715/501.1 |
| 6,687,696 | B2 * | 2/2004 | Hofmann et al. .................. 707/6 |
| 6,772,124 | B2 * | 8/2004 | Hoffberg et al. ........... 704/270.1 |
| 6,857,102 | B1 * | 2/2005 | Bickmore et al. ......... 715/501.1 |
| 6,901,399 | B1 * | 5/2005 | Corston et al. .................... 707/6 |
| 6,901,402 | B1 * | 5/2005 | Corston-Oliver et al. ..... 707/101 |
| 6,981,040 | B1 * | 12/2005 | Konig et al. .................. 709/224 |
| 2002/0038299 | A1 * | 3/2002 | Zernik et al. ....................... 707/3 |
| 2002/0052928 | A1 * | 5/2002 | Stern et al. ..................... 709/218 |
| 2002/0107853 | A1 * | 8/2002 | Hofmann et al. ................. 707/7 |
| 2003/0050784 | A1 * | 3/2003 | Hoffberg et al. ........... 704/270.1 |
| 2004/0034652 | A1 * | 2/2004 | Hofmann et al. .............. 707/102 |
| 2004/0205035 | A1 * | 10/2004 | Rimoux ......................... 706/14 |
| 2004/0260556 | A1 * | 12/2004 | Hoffberg et al. ........... 704/270.1 |
| 2005/0043936 | A1 * | 2/2005 | Corston-Oliver et al. ........ 704/4 |
| 2005/0060139 | A1 * | 3/2005 | Corston-Oliver et al. ........ 704/1 |
| 2005/0091243 | A1 * | 4/2005 | Corston-Oliver et al. .... 707/100 |
| 2005/0114294 | A1 * | 5/2005 | Corston-Oliver et al. ........ 707/1 |
| 2005/0125404 | A1 * | 6/2005 | Corston-Oliver et al. ........ 707/6 |
| 2005/0125429 | A1 * | 6/2005 | Corston-Oliver et al. .... 707/100 |
| 2005/0165778 | A1 * | 7/2005 | Obata et al. ....................... 707/5 |

OTHER PUBLICATIONS

Hofmann, Thomas; Learning probabilistic models of the Web; Jul. 2000; Annual ACM Conference on Research and Development in Information Retrieval; pp. 369-371.*

(Continued)

*Primary Examiner* — Cesar B Paula
*Assistant Examiner* — Nathan Hillery
(74) *Attorney, Agent, or Firm* — William Stock; Ryan, Mason & Lewis, LLP (57) ABSTRACT

Methods and apparatus for performing intelligent crawling are provided. Particularly, the intelligent crawling techniques of the invention provide a crawler mechanism which is capable of learning as it crawls in order to focus the search for documents on the information network being explored, e.g., world wide web. This crawler mechanism stores information about the crawled documents as it retrieves the documents, and then uses the information to further focus its search appropriately. The inventive techniques result in the crawling of a small percentage of the documents on the world wide web.

27 Claims, 5 Drawing Sheets

OTHER PUBLICATIONS

S. Chakrabarti et al., "Focused Crawling: A New Approach to Topic-Specific Web Resource Discovery," Computer Networks, 25 pages, 1999.

S. Chakrabarti et al., "Distributed Hypertext Resource Discovery Through Examples," Proceedings of the 25th VLDB Conference, Edinburgh, Scotland, pp. 375-386, 1999.

* cited by examiner

METHODS AND APPARATUS FOR INTELLIGENT CRAWLING ON THE WORLD WIDE WEB

FIELD OF THE INVENTION

The present invention is related to large scale resource discovery and, more particularly, to methods and apparatus for performing large scale collection of web pages from the world wide web.

BACKGROUND OF THE INVENTION

The world wide web (or "web") has seen a rapid explosion of information in the past few years. The rapid growth and dynamic nature of the web makes it important to be able to perform resource discovery effectively off the web. Consequently, several new techniques have been proposed in recent years. Among them, a key idea is focused on "crawling" which is a resource discovery technique allowing large relevant portions of the world wide web to be quickly searched without having to explore all web pages.

A "crawler" is a software program which can perform large scale collection of web pages from the world wide web by fetching web pages in a structured fashion. A crawler functions by first starting at a given web page; transferring it from a remote server using, for example, HTTP (HyperText Transfer Protocol); then analyzing the links inside the file and transferring those documents recursively.

This invention addresses the problem of intelligent resource discovery on the world wide web. In recent years, the problem of performing effective resource discovery by focused crawling and searching has received considerable attention, see, e.g., S. Chakrabarti et al., "Focused Crawling: A new approach to topic-specific resource discovery," Computer Networks, 31:1623-1640, 1999; and S. Chakrabarti et al., "Distributed Hypertext Resource Discovery Through Examples," VLDB Conference, pp. 375-386, 1999. One approach on focused crawling proposes the discovery of resources by using the simple model that pages linking from a particular topic are likely to point to the same topic. Thus, the crawler is forced to stay focused on specific topics while performing the resource discovery on the web. The idea of the focused crawler as proposed in the above-referenced S. Chakrabarti et al. article, "Focused Crawling: A new approach to topic-specific resource discovery," is to only recover a small percentage of the documents on the world wide web which are topic specific.

Furthermore, the crawler may be used only in the context of a hypertext classifier (pre-trained with some data; which also requires resource discovery). Provision of such trained hierarchical classifiers which are well representative of the web resource structure is not always possible from a practical perspective. The crawling technique is highly sensitive to the nature and specificity of the classes in the hypertext classifier, and the quality of the hierarchy used. If the classes are too specific, the crawler stalls; if the classes are too broad, the crawler diffuses away. Often, administrator guidance is needed in order to prevent such difficulties. The intelligence and quality of crawling may be hidden in the nature of the initial hierarchical trained classes provided, and the skill of the administrator in a process which may require hours. Furthermore, users are often likely to want to provide arbitrary predicates in order to perform resource discovery. These arbitrary predicates could be simple keywords (as in search engines where pre-crawled data is stored); topical searches using hypertext classifiers (as in focused crawling); document similarity queries; topical linkage queries; or any combination of the above. The only restriction is that the predicate should be efficiently computable.

The focused crawling approach is a somewhat simple model where it is assumed that the web has a specific a linkage structure in which pages on a specific topic are likely to link to the same topic. Considerable input is required from the system in terms of training data, classification hierarchy, starting points and administrator support. This may not always be possible in many systems.

SUMMARY OF THE INVENTION

The present invention provides methods and apparatus for performing intelligent crawling. Particularly, the intelligent crawling techniques of the invention provide a crawler mechanism which is capable of learning as it crawls in order to focus the search for documents on the information network being explored, e.g., world wide web. This crawler mechanism stores information about the crawled documents as it retrieves the documents, and then uses the information to further focus its search appropriately. The inventive techniques result in the crawling of a small percentage of the documents on the world wide web.

In one aspect of an intelligent crawling methodology of the present invention, a computer-based method of performing document retrieval in accordance with an information network (e.g., world wide web) comprises the steps of: retrieving one or more documents (e.g., web pages) from the information network that satisfy a user-defined predicate; collecting statistical information about the one or more retrieved documents as the one or more retrieved documents are analyzed; and using the collected statistical information to automatically determine further document retrieval operations.

In further aspects of the invention, the user-defined predicate may specify content associated with a document. The statistical information collection step may use content of the one or more retrieved documents. The statistical information collection step may consider whether the user-defined predicate has been satisfied by the one or more retrieved documents. The collected statistical information may be used to direct further document retrieval operations toward documents which are more likely to satisfy the predicate. Further, the collected statistical information may be used to direct further document retrieval operations toward documents which are similar to the one or more retrieved documents that also satisfy the predicate. Still further, the collected statistical information may be used to direct further document retrieval operations toward documents which are linked to by other documents which also satisfy the predicate. In the case where the information network is the world wide web and a document is a web page, the statistical information collection step may use one or more uniform resource locator (URL) tokens in the one or more retrieved web pages.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides a more interesting and significantly more general alternative to conventional crawling techniques. As is evident from the teachings herein, no specific model for web linkage structure is assumed in intelligent crawling according to the invention. Rather, the crawler gradually learns the linkage structure statistically as it progresses. By linkage structure, we refer to the fact that there is a certain relationship between the content of a web page and the candidates that it links to. For example, a web page containing the word "Edmund Guide" is likely to link to web pages on automobile dealers. In general, linkage structure refers to the relationship between the various features of a web page such as content, tokens in Universal Resource Locators (URL), etc. Further, in general, it is preferred that the linkage structure be predicate-dependent. An intelligent crawler according to the invention learns about the linking structure during the crawl and find the most relevant pages. Initially, the crawler behavior is as random as a general crawler but it then gradually starts auto-focusing as it encounters documents which satisfy the predicate. A certain level of supervision in terms of documents which satisfy the predicate may be preferred since it would be very helpful in speeding up the process (especially for very specific predicates), but is not essential for the framework of the invention. This predicate may be a decision predicate or a quantitative predicate which assigns a certain level of priority to the search.

The intelligent crawler of the invention may preferably be implemented as a graph search algorithm which works by treating web pages as nodes and links as edges. The crawler keeps track of the nodes which it has already visited, and for each node, it decides the priority in which it visits based on its understanding of which nodes is likely to satisfy the predicate. Thus, at each point the crawler maintains candidate nodes which it is likely to crawl and keeps re-adjusting the priority of these nodes as its information about linkage structure increases.

In order to facilitate the description of the invention, we define some terminology which will be used throughout the description of the invention:

URL: This is also referred to as a Universal Resource Locator. It provides the web addresses from which the pages are to be transferred. An example of a Universal Resource Locator is "http://web.mit.edu."

Predicate: These are the conditions which are imposed on web pages in order to crawl them. An example of a predicate is a web page which contains both the words "mountain" and "skiing."

In order to create an effective statistical model which models linkage structure, we are looking for specific features in the web page which makes it more likely that the page is likely to link to a given topic. These features may include but are not restricted to:

(1) The content of the web pages which are known to link to the candidate URL (the set of words).

(2) Whether the web pages which link to the candidate URL also link to other URLs which satisfy the predicate (a hub).

(3) URL tokens from the candidate URL, e.g., if we are looking for skiing web pages, the word "ski" in the URL is highly suggestive. For this purpose, we also provide feature extraction mechanisms from the tokens inside the candidate URL. In general, URL names of web pages contain highly relevant information, since web page and server names are usually not chosen randomly.

(4) Geographical location of the candidate URL. For example, web pages on civil war veterans will probably always be located in the United States.

In general, the importance of any of the above kinds of features may be predicate dependent. It is the crawler's job to learn this and find it out. It is expected that at the end of the process, the crawler is able to report a satisfactory resource of web pages which are on topic.

The model input is a set of features, and the output is a priority order which determines how the URLs are to be visited. The statistical model of the invention maintains a dynamically updated set of statistical information which it has learned during the crawl and a set of features in the given web page, and computes a priority order for that web page. The following detailed description illustrates the construction and operation of a crawler mechanism which uses the order associated with a web page to be able to crawl a large fraction of the world wide web by using focused techniques.

Figure 1:
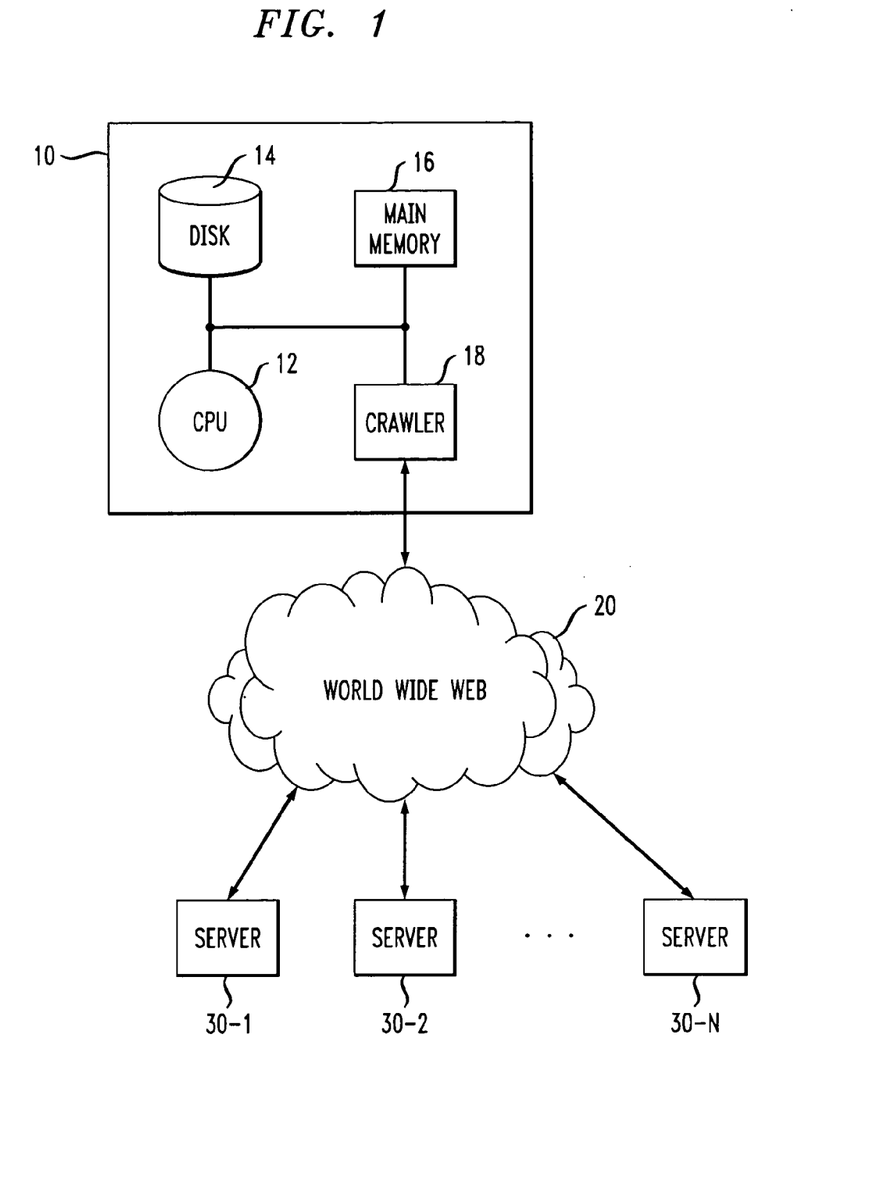
FIG. 1 is a block diagram illustrating a hardware implementation suitable for employing intelligent web crawling methodologies according to an embodiment of the present invention.

FIG. 1 is a block diagram illustrating a hardware implementation suitable for employing intelligent web crawling methodologies according to an embodiment of the present invention. As illustrated, an exemplary system comprises a computer system 10 (e.g., a client device) coupled, via a large network 20, to a plurality of server computer systems 30-1, . . . 30-N. It is to be understood that the plurality of servers 30-1, . . . , 30-N comprise the information sources that the client seeks to explore. The computer system 10 may comprise a central processing unit (CPU) 12, coupled to a disk 14, a main memory 16 and a crawler mechanism 18. Also, while not expressly shown, the system 10 may include input devices (e.g., keyboard, mouse) and output devices (display monitor, printer) for respectively entering data and viewing data associated with the methodologies described herein. The main memory 16 may also comprise a cache in order to speed up calculations. It is assumed that computer system 10 can interact with one or more of the servers 30-1, . . . , 30-N over the large network 20. It is to be appreciated that the network 20 may be a public information network such as, for example, the Internet or world wide web, however, the client and servers may alternatively be connected via a private network, a local area network, or some other suitable network.

As previously mentioned, the present invention provides a crawler 18 which is able to grab web pages off the web which correspond to specific predicates. The crawler 18, as shown in FIG. 1, operates under the control of the CPU 10 and in conjunction with the disk 14 and main memory 16. It is to be appreciated that, in accordance with this illustrative embodiment, the disk 14 may hold the database of web pages which have already been obtained off the world wide web. The CPU 12 performs the computations necessary to make decisions on the web pages which should be downloaded off the world wide web. In addition, the main memory 16 preferably has the ability to cache documents and intermediate results. Details of these and other operations will be described below.

In one preferred embodiment, software components including instructions or code for performing the intelligent crawling methodologies of the invention, as described herein, may be stored in one or more memory devices described above with respect to the computer system 10 and, when ready to be utilized, loaded in part or in whole and executed by the CPU 12. Thus, while the intelligent crawler is illustrated as a separate functional block 18 in FIG. 1, it is to be appreciated that the crawler preferably comprises software instructions or code executing on a computer system (i.e., under control of the CPU and in accordance with the memory and input/output components). Of course, the crawler may be implemented in software, hardware and/or combinations thereof. Also, the computer system may be any processing device capable of executing the methodologies described herein, e.g., personal computer, mini-computer, micro-computer, etc. Likewise, the servers shown in FIG. 1 may have similar processing capabilities.

Figure 2:
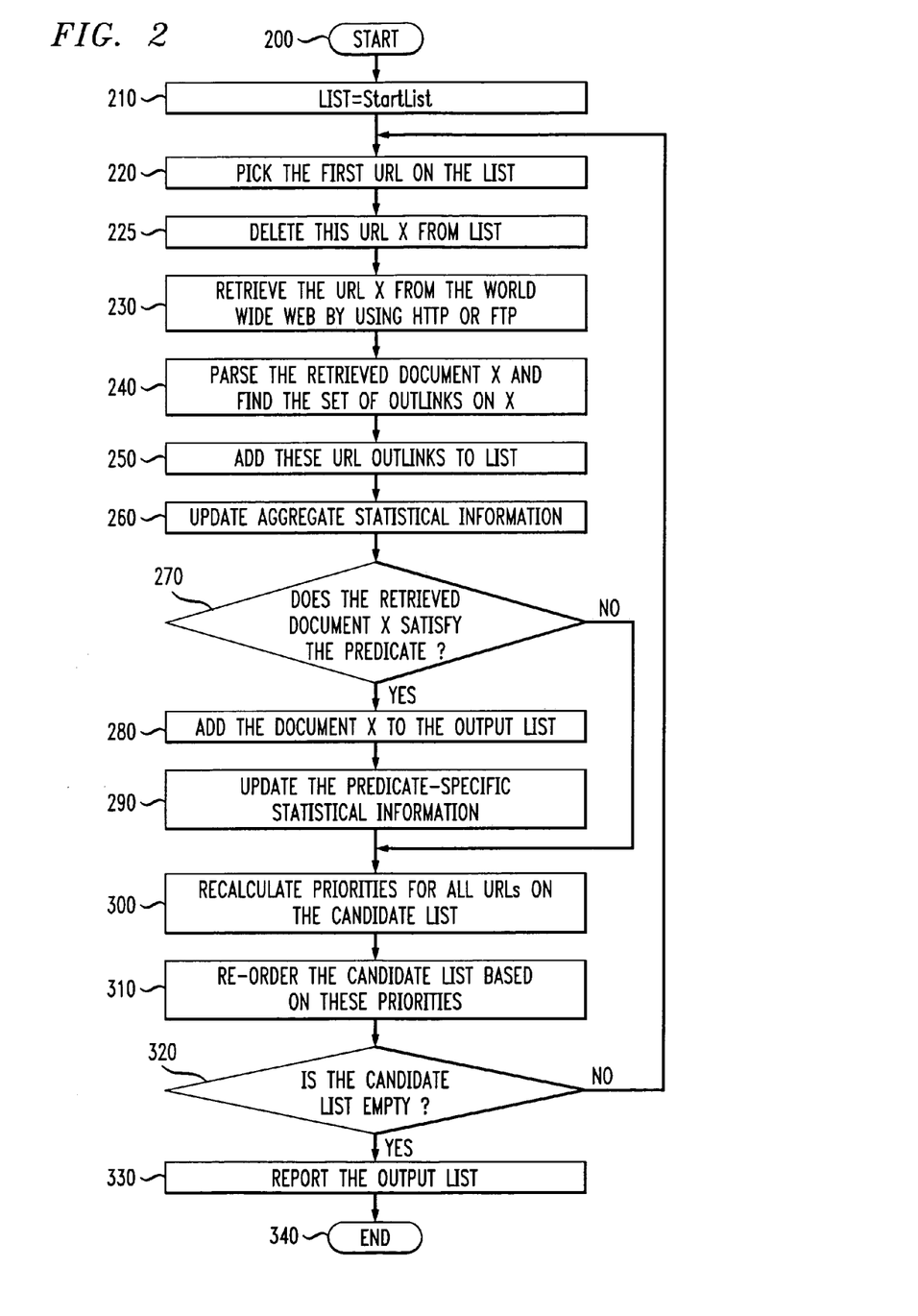
FIG. 2 is a flow diagram illustrating an overall process for intelligent web crawling according to an embodiment of the present invention.

FIG. 2 is a flow diagram illustrating an overall process for intelligent web crawling according to an embodiment of the present invention. This is the overall process which may be implemented by the computer system 10 shown in FIG. 1. As will be evident, the intelligent crawling method shown in FIG. 2 recursively crawls the URL pages and maintains two sets of statistical information: (1) aggregate statistical information; and (2) predicate-specific statistical information. These two sets of information may be used in order to effectively find the web pages which are most related to a given predicate. The aggregate statistical information is maintained on all the retrieved web pages. This aggregate information is updated every time a web page is retrieved. The predicate-specific information is updated every time a web page belonging to a given predicate is retrieved. The aggregate information is likely to be different from the predicate-specific information. This difference is used to determine which of the URL documents are more likely than others to belong to the predicate. The input to the method of FIG. 2 is a list of URLs from which the crawl starts. In addition, a predicate which is used to focus and control the crawl is input. These inputs may be provided by a user.

The process begins at block 200. In step 210, the method initializes the list of URL documents (List) to a starting list (StartList). Typically, this starting list of candidate URL documents should be chosen in a way so as to have very high reachability. For example, a web page such as "www.yahoo.com" or "www.netscape.com" has very high reachability in terms of the number of web pages which can be reached from it. In step 220, the first URL on this list is picked. This URL is deleted from the list in step 225. We shall henceforth refer to this URL along with the corresponding document by the label X. This URL X is then retrieved from the world wide web using either HTTP or the File Transfer Protocol (FTP). In step 230, the retrieved document X is parsed in order to find the URL outlinks (i.e., embedded URLs in document X linking document X to other documents on the web) in the document X. These outlinks are added to List in step 250. By adding the outlinks to List, the method is ensuring that in later iterations, these URL links will be crawled recursively.

Next, in step 260, the aggregate statistical information is updated using the information from the crawled URLs. In step 270, the method determines if the retrieved document X satisfies the predicate. If so, the document is added to the output list of documents (step 280), and the predicate-specific statistical information is updated (step 290). After this, in either case (whether or not X satisfies the predicate), the priorities for all the URLs on the candidate list are recalculated in step 300. A detailed description of how this is achieved will be provided in FIG. 5. In step 310, these recalculated priorities are used to re-order the candidate list. In step 320, the method checks if the candidate list is empty. If so, then the output list is reported (step 330) and the process terminated (block 340). Otherwise, the method returns to step 220 to pick the first URL from List and repeats the process.

Figure 3:
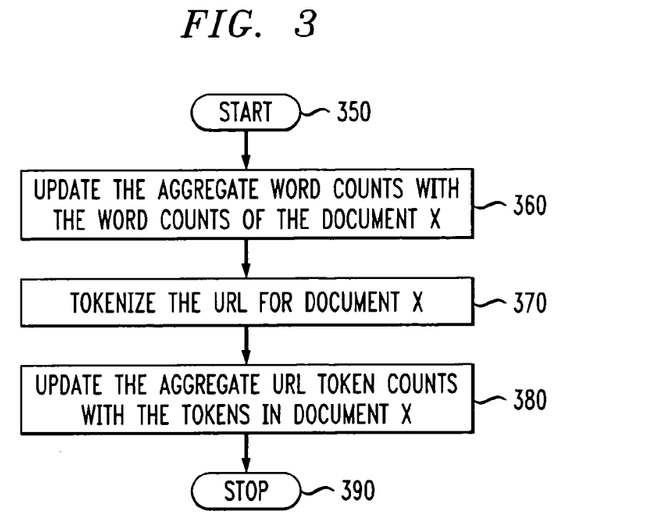
FIG. 3 is a flow diagram illustrating a procedure for updating aggregate statistical information according to an embodiment of the present invention.

FIG. 3 is a flow diagram illustrating a procedure for updating aggregate statistical information according to an embodiment of the present invention. The process shown in FIG. 3 corresponds to step 260 in FIG. 2. The aggregate statistical information contains two kinds of information:

(1) The number of times each word has occurred during the entire process of crawling.

(2) The number of times that each token in any URL has occurred during the entire process of crawling.

Both of these pieces of information are updated by the process of FIG. 3 which begins at block 350. The first piece of information is updated in step 360, wherein the aggregate word counts are updated with the word counts for the document X. For example, if the word "ski" occurs 5 times in document X, then the aggregate word count for the word "ski" is incremented by 5. This process is repeated for all the words in document X. Next, in step 370, the URL for that particular document is tokenized. The idea of "tokenizing" a URL is as follows. For example, consider a URL called "http://www.skiresorts.com," then the possible tokens from the URL could be "www," "skiresorts," and "com." The process of tokenization is explained in detail in FIG. 6. In the next phase, as shown in FIG. 3, the aggregate token counts for each possible token are updated in the same way as the word counts for each of the possible words are updated. This is done in step 380. The process ends at block 390.

Figure 4:
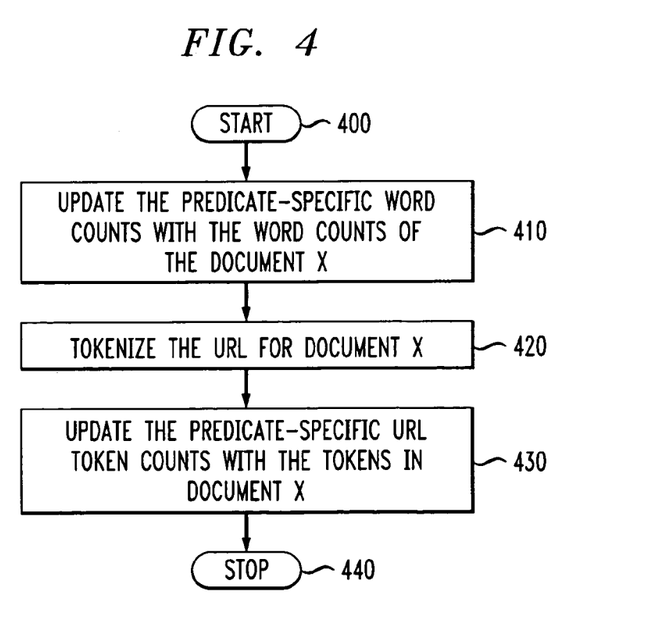
FIG. 4 is a flow diagram illustrating a procedure for updating predicate-specific word counts according to an embodiment of the present invention.

Just as aggregate information is maintained for all the documents which have been crawled so far, the intelligent crawling methodology of the invention also maintains the information for the subset of web pages which satisfy a given predicate, i.e., the predicate-specific statistical information. FIG. 4 is a flow diagram illustrating a procedure for updating predicate-specific information according to an embodiment of the present invention. The process shown in FIG. 4 corresponds to step 290 in FIG. 2. The process for performing this operation is exactly the same as the process discussed above in the context of FIG. 3 (thus FIG. 4 is very similar to FIG. 3), except that in this case, the updating is only performed for those web pages which satisfy the predicate. Thus, this second set of data is predicate-specific, and is likely to have significant statistical differences with the data obtained in accordance with the process of FIG. 3.

Thus, the process starts at block 400. In step 410, the method updates the predicate-specific word counts with the word counts of the document X. In step 420, the method tokenizes the URL for document X. Then, in step 420, the predicate-specific URL token counts are updated with the tokens in document X. The process ends at block 440.

Figure 5A:
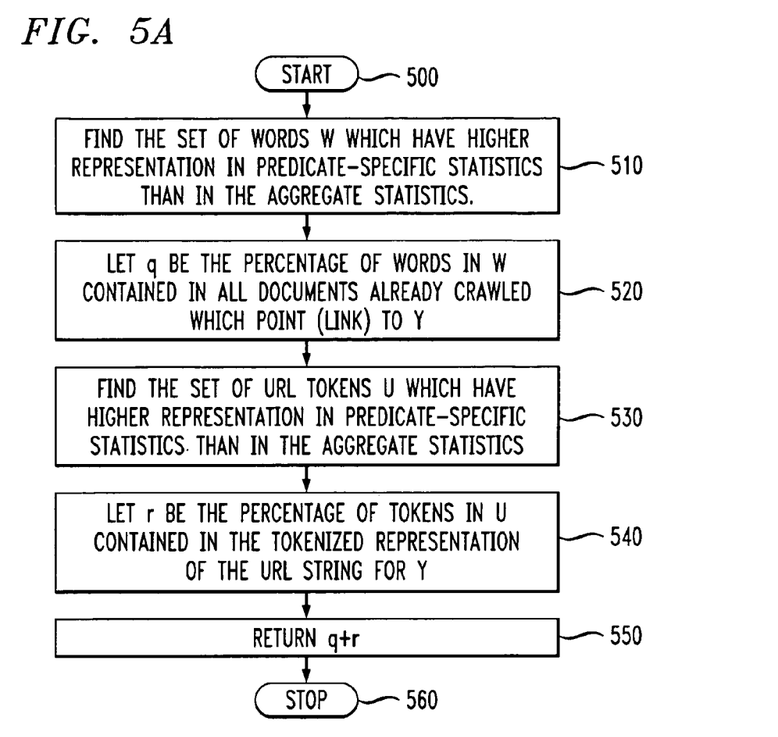
FIGS. 5A and 5B are flow diagrams illustrating a procedure for computing priority values for different candidate URLs using predicate-specific and aggregate statistics according to an embodiment of the present invention.
Figure 5B:
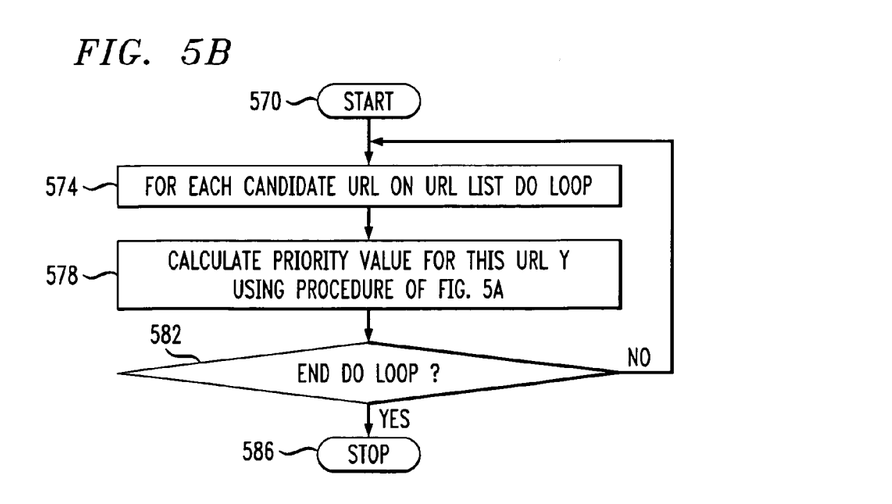

Turning now FIGS. 5A and 5B are flow diagrams illustrating a procedure for computing priority values for different candidate URLs using predicate-specific and aggregate statistics according to an embodiment of the present invention. These processes shown in FIGS. 5A and 5B correspond to step 300 in FIG. 2.

The overall iterative looping procedure is illustrated in FIG. 5B. The process begins at block 570. The DO LOOP represented by blocks 574 (start loop), 578 (calculate priority value) and 582 (end loop) is performed for each candidate URL on the URL list. The priority values for all the different candidate URLs are calculated one by one (step 578). The expansion of step 578 for a particular candidate URL (e.g., URL Y) is illustrated in FIG. 5A. The process ends at block 586.

Referring now to FIG. 5A, the priority calculation operation begins at block 500. In step 510, the set of words W which have a higher representation in predicate-specific statistics than in aggregate statistics is determined. Next, in step 520, the percentage q of words in W contained in all documents already crawled which link (point) to Y is determined. The higher this percentage, the greater the priority of a candidate URL, because it indicates that the candidate URL is linked to by web pages which have words which often occur in web pages which satisfy the predicate. In step 530, the set U of URL tokens which have a higher representation in predicate-specific statistics than in aggregate statistics is determined. In step 540, the method finds r which represents the percentage of tokens in set U contained in the tokenized representation of the URL string for Y. In step 550, the priority value for the candidate URL string for Y is reported as the sum of q and r. The process ends at block 560.

Figure 6:
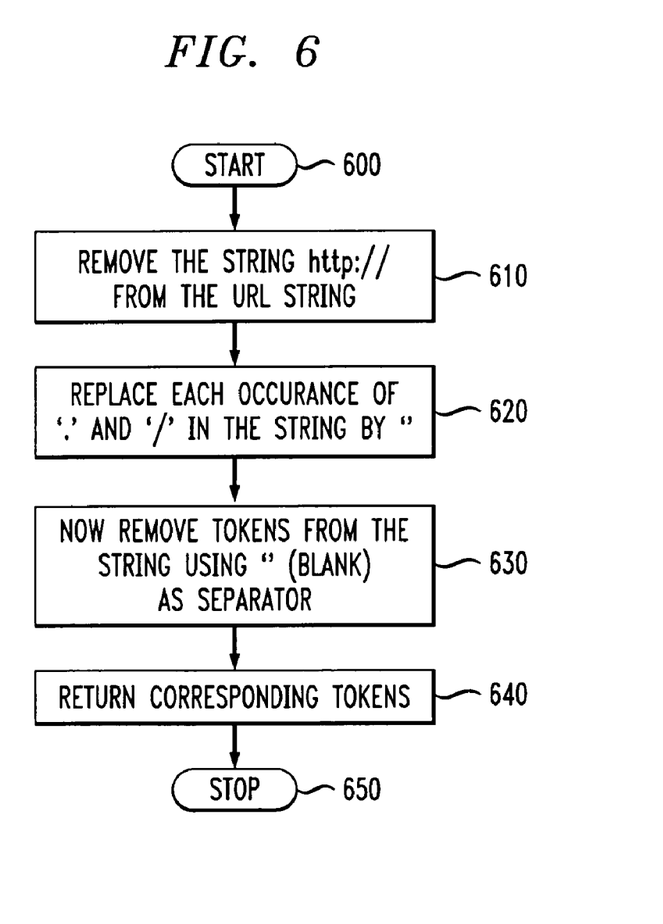
FIG. 6 is a flow diagram illustrating a procedure for tokenizing a URL according to an embodiment of the present invention.

FIG. 6 is a flow diagram illustrating a procedure for tokenizing a URL according to an embodiment of the present invention. The process shown in FIG. 6 corresponds to step 370 in FIG. 3 and step 420 in FIG. 4. Specifically, FIG. 6 shows how to tokenize the URLs for the different candidates. In order to do so, the method needs to be able to effectively parse the string structure for a given URL. For an example, consider the URL string "http://web.mit.edu/orc/home.html." The process begins at block 600. In step 610, the method removes the string "http://" from the URL string. For the particular example described above, this results in the string "web.mitedu/orc/home.html." In step 620, each occurrence of '.' and '/' in the string is replaced by a blank (' '). For the above example, this results in the string "web mit edu orc home html." In step 630, tokens from the string are removed using the blank as a separator. Thus, the tokens in this case would be web, mit, edu, orc, home and html. The tokens represent the output of the operation (step 640). The process ends at block 650.

Accordingly, as described in detail above, the present invention provides an intelligent crawling system which is capable of learning as it crawls in order to focus the search for documents on the world wide web. This system stores the information about the crawled documents as it retrieves the documents, and it uses the information to further focus its search appropriately. This results in the crawling of a small percentage of the documents on the world wide web.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of performing document retrieval in accordance with an information network, the method comprising the steps of:

initially retrieving one or more documents from the information network that satisfy a user-defined predicate, wherein the initial document retrieval operation is performed without assuming a specific model of a linkage structure such that the initial document retrieval operation retrieves the one or more documents without assuming that a relationship exists between a feature of a first one of the one or more documents and a feature of at least another one of the one or more documents that links to the first one;

collecting at least a set of aggregate statistical information and a set of predicate-specific statistical information about the one or more retrieved documents as the one or more retrieved documents are analyzed; and using the collected statistical information to automatically determine further document retrieval operations to be performed in accordance with the information network, wherein the statistical information using step further comprises learning a linkage structure from at least a portion of the collected statistical information with each successive document retrieval operation such that the learned linkage structure is available for use in performing subsequent document retrieval operations requested by a user.

2. The method of claim 1, wherein the user-defined predicate specifies content associated with a document.

3. The method of claim 1, wherein the statistical information collection step uses content of the one or more retrieved documents.

4. The method of claim 1, wherein the statistical information collection step considers whether the user-defined predicate has been satisfied by the one or more retrieved documents.

5. The method of claim 1, wherein the collected statistical information is used to direct further document retrieval operations toward documents which are more likely to satisfy the predicate than would otherwise occur with respect to document retrieval operations that are not directed using the collected statistical information.

6. The method of claim 1, wherein the collected statistical information is used to direct further document retrieval operations toward documents which are similar to the one or more retrieved documents that also satisfy the predicate.

7. The method of claim 1, wherein the collected statistical information is used to direct further document retrieval operations toward documents which are linked to by other documents which also satisfy the predicate.

8. The method of claim 1, wherein the information network is the world wide web and a document is a web page.

9. The method of claim 8, wherein the statistical information collection step uses one or more uniform resource locator tokens in the one or more retrieved web pages.

10. Apparatus for performing document retrieval in accordance with an information network, the apparatus comprising:

at least one processor operative to: (i) initially retrieve one or more documents from the information network that satisfy a user-defined predicate, wherein the initial document retrieval operation is performed without assuming a specific model of a linkage structure such that the initial document retrieval operation retrieves the one or more documents without assuming that a relationship exists between a feature of a first one of the one or more documents and a feature of at least another one of the one or more documents that links to the first one; (ii) collect at least a set of aggregate statistical information and a set of predicate-specific statistical information about the one or more retrieved documents as the one or more retrieved documents are analyzed; and (iii) use the collected statistical information to automatically determine further document retrieval operations to be performed in accordance with the information network, wherein the statistical information using operation further comprises learning a linkage structure from at least a portion of the collected statistical information with each successive document retrieval operation such that the learned linkage structure is available for use in performing subsequent document retrieval operations requested by a user.

11. The apparatus of claim 10, wherein the user-defined predicate specifies content associated with a document.

12. The apparatus of claim 10, wherein the statistical information collection operation uses content of the one or more retrieved documents.

13. The apparatus of claim 10, wherein the statistical information collection operation considers whether the user-defined predicate has been satisfied by the one or more retrieved documents.

14. The apparatus of claim 10, wherein the collected statistical information is used to direct further document retrieval operations toward documents which are more likely to satisfy the predicate than would otherwise occur with respect to document retrieval operations that are not directed using the collected statistical information.

15. The apparatus of claim 10, wherein the collected statistical information is used to direct further document retrieval operations toward documents which are similar to the one or more retrieved documents that also satisfy the predicate.

16. The apparatus of claim 10, wherein the collected statistical information is used to direct further document retrieval operations toward documents which are linked to by other documents which also satisfy the predicate.

17. The apparatus of claim 10, wherein the information network is the world wide web and a document is a web page.

18. The apparatus of claim 17, wherein the statistical information collection operation uses one or more uniform resource locator tokens in the one or more retrieved web pages.

19. An article of manufacture for performing document retrieval in accordance with an information network, comprising a machine readable medium containing one or more programs which when executed implement the steps of:

initially retrieving one or more documents from the information network that satisfy a user-defined predicate, wherein the initial document retrieval operation is performed without assuming a specific model of a linkage structure such that the initial document retrieval operation retrieves the one or more documents without assuming that a relationship exists between a feature of a first one of the one or more documents and a feature of at least another one of the one or more documents that links to the first one;

collecting at least a set of aggregate statistical information and a set of predicate-specific statistical information about the one or more retrieved documents as the one or more retrieved documents are analyzed; and using the collected statistical information to automatically determine further document retrieval operations to be performed in accordance with the information network, wherein the statistical information using step further comprises learning a linkage structure from at least a portion of the collected statistical information with each successive document retrieval operation such that the learned linkage structure is available for use in performing subsequent document retrieval operations requested by a user.

20. The article of claim 19, wherein the user-defined predicate specifies content associated with a document.

21. The article of claim 19, wherein the statistical information collection step uses content of the one or more retrieved documents.

22. The article of claim 19, wherein the statistical information collection step considers whether the user-defined predicate has been satisfied by the one or more retrieved documents.

23. The article of claim 19, wherein the collected statistical information is used to direct further document retrieval operations toward documents which are more likely to satisfy the predicate than would otherwise occur with respect to document retrieval operations that are not directed using the collected statistical information.

24. The article of claim 19, wherein the collected statistical information is used to direct further document retrieval operations toward documents which are similar to the one or more retrieved documents that also satisfy the predicate.

25. The article of claim 19, wherein the collected statistical information is used to direct further document retrieval operations toward documents which are linked to by other documents which also satisfy the predicate.

26. The article of claim 19, wherein the information network is the world wide web and a document is a web page.

27. The article of claim 26, wherein the statistical information collection step uses one or more uniform resource locator tokens in the one or more retrieved web pages.

* * * * *